United States Patent [19]

Spongh

[11] Patent Number: 4,481,591
[45] Date of Patent: Nov. 6, 1984

[54] METHOD AND APPARATUS FOR MODIFYING A PRERECORDED SEQUENCE OF ON/OFF COMMANDS FOR CONTROLLING A BISTABLE DEVICE OPERATING IN CONJUNCTION WITH A MOVING ROBOT UNDER PROGRAM CONTROL

[75] Inventor: Rolf T. Spongh, Waterloo, Belgium

[73] Assignee: Nordson Corporation, Amherst, Ohio

[21] Appl. No.: 354,313

[22] Filed: Mar. 3, 1982

[51] Int. Cl.³ .................... G06F 15/46; G05B 19/42
[52] U.S. Cl. ............................ 364/513; 318/568; 364/192; 364/193
[58] Field of Search ............... 364/513, 474, 478, 191, 364/192, 193; 318/568; 414/730, 744; 239/69, 70

[56] References Cited

U.S. PATENT DOCUMENTS

| 4,011,437 | 3/1977 | Hohn | 318/568 X |
| 4,021,651 | 5/1977 | Mitsuhashi et al. | 364/193 |
| 4,025,838 | 5/1977 | Watanabe | 318/568 |
| 4,086,522 | 4/1978 | Engelberger et al. | 364/513 X |
| 4,132,938 | 1/1979 | Sano et al. | 318/568 |
| 4,140,953 | 2/1979 | Dunne | 318/568 |
| 4,338,672 | 7/1982 | Perzley et al. | 364/513 |
| 4,403,281 | 9/1983 | Holmes et al. | 364/513 X |

Primary Examiner—Joseph F. Ruggiero
Attorney, Agent, or Firm—Wood, Herron & Evans

[57] ABSTRACT

A method and apparatus for real time editing, or modifying, of a stored program of prerecorded ON and OFF commands for a bistable workpiece-treating device mounted for movement by a robot. The editing occurs while both the ON/OFF program and a program of prerecorded robot motion commands which drive the robot are being processed by the robot controller, with the ON/OFF commands, as edited, being output to the bistable device for execution along with the robot commands, as well as stored in the memory as substitute commands for subsequent re-execution.

8 Claims, 9 Drawing Figures

METHOD AND APPARATUS FOR MODIFYING A PRERECORDED SEQUENCE OF ON/OFF COMMANDS FOR CONTROLLING A BISTABLE DEVICE OPERATING IN CONJUNCTION WITH A MOVING ROBOT UNDER PROGRAM CONTROL

This invention relates to a work-performing robot having a signal-controlled bistable device operating in conjunction therewith which executes a prerecorded sequence of motion and device commands stored in a robot controller memory, and more particularly, to an apparatus and method for editing, or modifying, while the robot is executing a programmed motion sequence, a program of device commands immediately prior to input to the device such that the device commands, as modified, are both executed by the device and stored in the controller memory for subsequent repetitive replay or re-execution by the device.

A work-performing robot, or manipulator, typically includes a plurality of links which are pivotally connected end-to-end at joints. Located at each joint is a rotary actuator, usually of the electrohydraulic type, which is responsive to an electrical signal for controlling the relative position, or angle, between the two links connected at the joint. Also located at each joint is an angular position transducer, for example, a resolver, which provides an electrical output signal correlated to the relative position or angle of the links at the joint. At the outboard end of the outermost link, a workpiece-treating unit, such as a spray coating gun, is secured for performing work on a workpiece located at a work station as the robot executes a prerecorded sequence of motions. The spray gun includes a bistable device, for example, a solenoid flow control valve, which is controlled by ON/OFF commands to regulate the flow of coating material emitted by the gun.

Associated with the work robot is a computerized robot controller in which is stored in a memory thereof a prerecorded sequence of position and ON/OFF commands. During program execution, or replay, the stored position commands are sequentially fetched from the memory, compared with current samples of actual robot position, and positional errors calculated corresponding to the difference between the position commands and the then current actual robot position, and the positional errors output from the controller to the robot to drive the robot to the desired or command position. Also during program execution, the ON/OFF commands are sequentially fetched from the controller memory and output to the spray gun to control the ON/OFF condition of the flow control valve. Since both the position and ON/OFF commands are processed concurrently, the emission of spray coating is coordinated with the movement of the gun relative to the workpiece.

The robot has plural axes or links which are separately controlled and driven by their respective actuators. Thus, each position command in the prerecorded sequence in reality constitutes a set of individual position command components corresponding to the different axes or links of the robot. For each set of link commands there is an ON/OFF command for the bistable device in the gun. Collectively, the link commands and the ON/OFF command constitute a group of commands. Depending upon the data processing capability of the controller, the group of commands, that is, individual position command components associated with the different robot links and the ON/OFF command, will be processed either serially or in parallel by the controller in the course of outputting the positional error signals to the different robot link actuators and the ON/OFF command to the gun solenoid valve. The group of position command components and ON/OFF command, regardless of whether individually processed by the controller in series or parallel, are retrieved from the controller memory for execution by the robot on a serial basis, i.e., group-by-group. If a programmed sequence of motions has N position commands and the robot has M axes, there are NM discrete robot link position commands which are in N sequential sets of M link commands. Associated with each of the N sets of M link commands is an ON/OFF command. During program execution, the N groups of M link commands and one ON/OFF command are executed serially by group, and either serially or parallel by link command and ON/OFF command.

Production of the prerecorded motion and ON/OFF command sequence, known as robot "training" or "teaching", can be accomplished in several ways. In accordance with one approach, a joy stick is used to control the robot actuators during programming such that the robot links move to position the robot output element in accordance with manual manipulation of the joy stick. The outputs of the robot link position transducers of the robot are periodically sampled and stored for subsequent execution by the robot without the aid of the joy stick, as is the condition of a manually-controlled ON/OFF switch which controls the spray gun.

In a second approach, a lightweight "training robot" is used which, except for the mass of the training robot and the absence of actuators for the links, is identical in all respects to the considerably more massive work robot being programmed. To program the work robot, the output element of the training robot, that is, the spray gun, is grasped manually by the individual doing the programming and moved through a sequence of motions which it is desired to have the work robot subsequently execute. Since the training robot is lightweight, it can be moved manually by the operator with little difficulty. As the training robot is being moved through the desired sequence of motions, position transducers at the joints of its links provide electrical link position signals which are recorded for subsequent reproduction and input to the actuator servoloops of the work robot. Simultaneous with robot movement, the ON/OFF switch on the gun, such as the gun trigger, is manually operated to control the emission of the coating material. The ON/OFF condition of the switch is recorded in synchronism with the recording of the link position transducer outputs for subsequent replay by the bistable device and robot, respectively.

A third method of robot programming involves bypassing or decoupling the actuators of the work robot and counter-balancing the work robot such that the operator may more easily move it through the desired path. The robot link position transducer outputs are recorded during this manual programming phase, as are the ON/OFF trigger signals, such that they can be subsequently replayed for execution by the robot and the bistable device, respectively.

A still further approach involves providing the work robot with motion or force sensing transducers. When an operator attempts to move the work robot during manual programming, the force or motion sensors detect the force or motion applied by the operator to the robot. The force or motion sensor outputs are input to the actuators for moving the individual work robot links in accordance with the manual force or motion applied thereto by the operator. As the robot links move under power assistance, the link position transducer outputs are recorded, along with the ON/OFF trigger condition signals, for subsequent replay and execution by the robot and bistable device, respectively.

Thus, during training of a spray painting robot having a manual trigger-operated ON/OFF solenoid valve designed to control the flow of coating from the spray gun, and in conjunction with periodic sampling and storing of the robot link position transducer outputs to produce the recorded motion sequence which it is desired to thereafter replay for execution by the robot, the status of the manual, trigger-operated ON/OFF flow control solenoid valve is sampled and stored as solenoid valve commands. When the robot program is thereafter replayed, the recorded sequence of ON/OFF solenoid valve commands are output to the spray gun in synchronism with the sequence of robot position commands, thereby coordinating spray coating emission with spray gun position.

It sometimes becomes desirable to modify one or more ON/OFF commands used to control a spray gun flow control solenoid valve which have been recorded during the robot "training", or "teaching", phase. For example, if during the manual robot training phase the operator imperfectly programmed the robot such that the object the robot is being trained to spray coat has insufficient paint in certain areas, when the recorded program is executed, or replayed, by the robot the articles to be coated will be deficient in the same manner and to the same extent as the object coated by the operator during the manual training phase. Under such circumstances, it is desirable to edit, or modify, one or more of the sequence of stored ON/OFF commands which control the operation of the flow control solenoid valve in the gun so that when the modified program is replayed, or executed, by the robot, the deficiencies in paint coverage on the object being coated will be corrected.

Accordingly, it has been an objective of this invention to provide a simple, inexpensive, and convenient apparatus and method for editing, or modifying, a programmed sequence of ON/OFF commands for a bistable device which moves with the robot to treat a workpiece, such as a solenoid valve in a spray gun mounted to the output link of the robot, such that when the modified sequence of ON/OFF commands are output to the bistable device, it will operate in a manner which corrects the deficiency in operation of the bistable device, for example, the flow control valve in the spray gun, which rendered the previously recorded ON/OFF program partially or totally unusable. This objective has been accomplished in accordance with certain principles of the invention by conducting ON/OFF command program editing, or modification, with the aid of a suitable manually-activated ON/OFF input means, during program processing by the robot controller immediately prior to input of the position commands and ON/OFF commands to the robot such that the program, as modified, is both executed by the robot and stored in the controller memory for subsequent replay or re-execution, thereby achieving what effectively constitutes real time program editing of the ON/OFF commands during program execution by the robot. An important advantage of this invention is that the operator, via the manually-activated ON/OFF input means, cannot only edit the program under manual control, but can actually monitor the edited program as it is being executed by the robot, making further ON/OFF program changes as necessary and, again, on a real time basis.

In a preferred form of the invention, editing means are provided, having a manually-activated ON ONLY switch means, which is alternatively operable in one of three different modes. In the first mode, the editing means is operable upon initial activation of the ON ONLY switch means to modify sequentially retrieved OFF commands to ON commands. In the second mode, the editing means is operable, in response to the first OFF-to-ON transition in sequentially retrieved ON/OFF commands following activation of the ON ONLY switch means, to not thereafter modify subsequent sequentially retrieved OFF commands to ON commands notwithstanding continued activation of the ON ONLY switch means. Finally, in the third mode the editing means is operable, in response to deactivation of the ON ONLY switch means prior to receipt of the first OFF-to-ON transition to, terminate modification of sequentially retrieved OFF commands to ON commands occurring subsequent to deactivation of the ON ONLY switch means. In operation, the editing means, with its manually-activated ON ONLY switch means, is effective to modify only OFF commands occurring between initial activation of the ON ONLY switch means and the first to occur of (a) deactivation of the ON ONLY switch means or (b) the first OFF-to-ON transition.

In accordance with certain further principles of this invention, the editing means is provided with a manually-activated OFF ONLY switch means, which enables the editing means to operate in three additional modes for converting ON commands to OFF commands. In the first additional mode, the editing means is operable upon initial activation of the OFF ONLY switch means to modify subsequent sequentially retrieved ON commands to OFF commands. In the second additional mode, the editing means is operable, in response to the first ON-to-OFF transition in the sequentially retrieved ON/OFF commands following activation of the OFF ONLY switch means, to not thereafter modify sequentially retrieved ON commands to OFF commands notwithstanding continued activation of the OFF ONLY switch means. In the third additional mode, the editing means is operable, in response to deactivation of the OFF ONLY switch means prior to the first ON-to-OFF transition, to terminate modification of sequentially retrieved ON commands to OFF commands occurring subsequent to deactivation of the OFF ONLY switch means. In operation, the OFF ONLY switch means is effective to permit the editing means to modify only ON commands occurring between initial activation of the OFF ONLY switch means and the first to occur of (a) deactivation of the OFF ONLY switch means or (b) receipt of the first ON-to-OFF transition.

The practical effect of the ON ONLY editing capability can most readily be appreciated in situations where the ON commands are of only very short duration and follow each other in rapid sequence with only very short duration OFF intervals between them. Under such circumstances if the operator is unnecessarily slow in deactivating the trigger following activation of it, paint may be added during more than the single OFF interval during which the ON ONLY switch was activated, when it was only intended that paint be added during the single OFF interval during which the ON ONLY switch was activated. With the ON ONLY edit capability of this invention, the foregoing problem is solved since deactivation of the ON ONLY switch in an OFF interval subsequent to the OFF interval immediately following that in which the ON ONLY switch was activated is effective to add paint only during the OFF interval in which the ON ONLY switch is activated. Continued activation of the ON ONLY switch during an OFF interval subsequent to the OFF interval in which the ON ONLY switch was activated is not effective to add paint during the period of continued activation in the subsequent OFF interval.

Similarly, when an operator is editing a program consisting of rapidly occurring OFF intervals of short duration, with short intervening ON intervals, it is possible to remove more paint than is desired by failure of the operator to deactivate the OFF ONLY switch at the proper time. With the OFF ONLY editing capability of this invention the removal of unnecessary paint by sluggish release of the OFF ONLY switch does not occur. If the OFF ONLY switch is activated during an ON interval, but not released until some point in a subsequent ON interval, continued activation of the OFF ONLY switch during the subsequent ON interval will not be effective to remove paint during that portion of the subsequent ON interval prior to deactivation of the OFF ONLY switch. Stated differently, activation of the OFF ONLY switch is only effective to remove paint in the ON interval in which the OFF ONLY switch is first activated, and then only for the duration in that interval that the OFF ONLY switch remains activated.

Summarizing, with this invention a prerecorded sequence of ON/OFF commands for a robot-mounted, bistable, workpiece-treating device can be modified and stored for subsequent replay simultaneously with execution of the modified commands by the bistable device and execution of the position commands by the robot. In this way, it is possible for the operator to effectively modify under manual control an ON/OFF program while it is being executed. An advantage of this approach to editing ON/OFF commands is that the operator can see the effect the edited ON/OFF commands have on the workpiece during the editing process and while the robot is executing its programmed sequence of motions. Stated differently, the operator can edit the ON/OFF program on a real time basis as it is being executed by the device when being moved by the robot.

These and other features, objectives, and advantages of the invention will become more readily apparent from a detailed description thereof taken in conjunction with the drawings in which.

Figure 1:
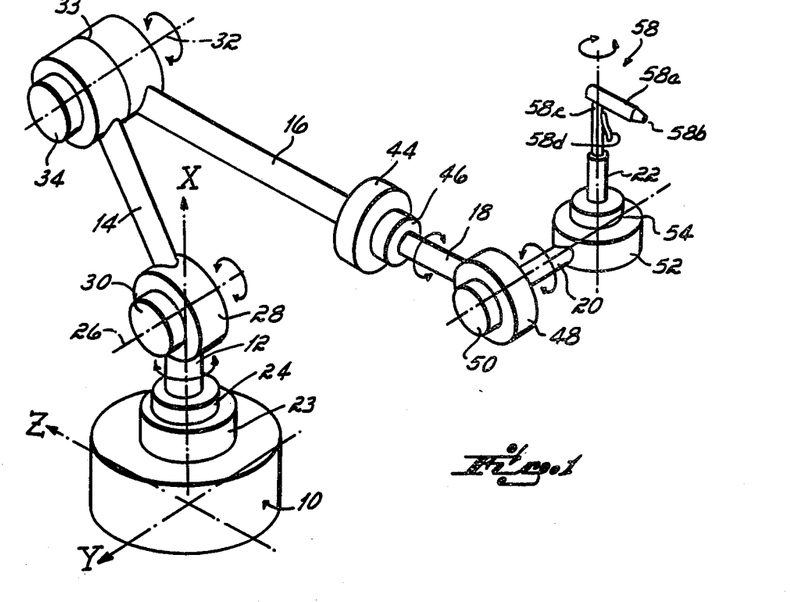
FIG. 1 is a perspective view, in schematic form, of a typical work-performing robot, or manipulator, showing the general relationship of the relatively massive robot links and their respectively associated actuators and position transducers.

With reference to FIG. 1, a typical work-performing robot, or manipulator, with respect to which this invention is useful for providing real time editing of ON/OFF commands which a bistable device operating in conjunction with the robot is to execute relative to a workpiece contained in a programmed series, is seen to include a base 10 which rests on the floor or other appropriate surface for supporting the robot. Extending from the base 10 are plural, series-connected, elongated, articulated members or links 12, 14, 16, 18, 20 and 22 which, in the preferred embodiment, provide the robot with several, in this instance six, degrees of freedom. In practice, the links 12, 14, 16, 18, 20, and 22 collectively constitute a relatively large mass. For example, the links 12, 14, and 16 are each approximately 1-4 feet in length, and typically weigh in the range of 10-400 pounds each. The links 18, 20, and 22 which, in the work-performing robot shown in FIG. 1 constitute a wrist, typically are significantly less massive than the links 12, 14 and 16, although this is not necessarily the case.

The link 12 is vertically disposed and mounted to the base 10 by a suitable joint which permits the link to rotate about its longitudinal axis which is coincident with the X axis. An actuator 23 is associated with the link 12, and is responsive to a position error signal provided by a conventional robot controller (not shown in FIG. 1) to facilitate selective, bidirectional, angular motion of the link 12 in an azimuthal direction about its longitudinal axis to the desired link position. Also associated with the link 12 is a position transducer 24 which provides an electrical signal correlated to the actual angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y-Z plane. Associated with the link 14 is an actuator 28 which is responsive to a position error signal from the robot controller and facilitates selective, bidirectional, elevational, pivotal movement of the link 14 about horizontal axis 26 to the desired link position. Also associated with the link 14 is a position transducer 30 which provides an electrical signal correlated to the actual elevational position of the link 14 relative to the link 12.

The link 16 at its inner end is connected to the upper end of the link 14 by a suitable joint for permitting the link 16 to move in a vertical plane about horizontal axis 32 which is parallel to axis 26. A suitable transducer 34 is associated with the link 16 for providing an electrical signal correlated to the actual angular elevational position of the link 16 with respect to the link 14. An actuator 33, associated with the link 16, is responsive to a position error signal from the robot controller and facilitates selective, bidirectional, elevational, pivotal movement of the link 14 about horizontal axis 32 to the desired link position.

The actuator 23 which bidirectionally drives the link 12 about the X axis provides the work-performing robot with one degree of freedom, namely, azimuthal positioning motion, while the actuators 28 and 33 which bidirectionally drive the link 14 and link 16, respectively, provide the robot with two degrees of freedom, each in an elevational direction.

The articulated links 18, 20, and 22 collectively constitute a wrist. Link 18 at its inner end is connected via a suitable joint to the outer end of the link 16. An actuator 44 is associated with the wrist member 18 for bidirectionally rotating, when input with suitable position error signals from the robot controller, the wrist member 18 to the desired link position about its longitudinal axis which is coincident with the longitudinal axis of the link 16. A suitable position transducer 46 is associated with the link 18 for providing an electrical signal correlated to the actual relative rotational position of the link 18 with respect to the link 16.

The link 20 is connected at its inner end via a suitable joint to the outer end of the link 18 for providing rotational movement of link 20 about its longitudinal axis which is perpendicular to the longitudinal axis of link 18. An actuator 48 is associated with link 20, and when input with suitable position error signals from the robot controller, bidirectionally rotates link 20 about its longitudinal axis perpendicular to the longitudinal axis of link 18 to the desired link position. A suitable position transducer 50 is also associated with link 20 for providing an electrical output correlated to the actual rotational position of this link relative to link 18.

Link 22 is connected via a suitable joint to the outer end of link 20 to facilitate rotation of link 22 about its longitudinal axis which is disposed perpendicularly to the longitudinal axis of link 20. An actuator 52 associated with link 22, when input with suitable position error signals from the robot controller, facilitates bidirectional motion of link 22 about its longitudinal axis to the desired link position. A transducer 54, also associated with link 22, provides an electrical signal output correlated to the actual relative rotational position of link 22 relative to link 20.

Link 22 constitutes the mechanical output element of the work-performing robot. While the mechanical output of the robot can be utilized for positioning a wide variety of devices, in the preferred form of the invention the work-performing robot is utilized to position a spray coating gun 58 having a barrel 58a with a nozzle 58b which emits coating particles. The gun handle 58c is mounted to the upper end of the wrist link 22. The gun handle 58c mounts a suitable trigger mechanism 58d which, when actuated by a suitable signal-operated device (not shown), functions to control the emission of coating particles from the nozzle 58b of the spray gun 58.

The longitudinal rotational axes of wrist links 18, 20, and 22 are mutually perpendicular, and accordingly constitute three degrees of freedom for the robot. These three degrees of freedom, coupled with the three degrees of freedom of the links 12, 14, and 16, provide a total of six degrees of freedom for the work-performing robot.

In the operation of the work-performing robot shown in FIG. 1, a series of programmed, i.e., desired, link position command signals stored in a suitable memory device of the robot controller are periodically retrieved and compared against the actual link position signals provided by the link position transducers 24, 30, 34, 46, 50, and 54, and in response thereto the link positional error signals are generated for each of the links 12, 14, 16, 18, 20, and 22. The positional error signals for the various links 12, 14, 16, 18, 20, and 22 are then input to the various link actuators, 23, 28, 33, 44, 48, and 52, which typically are of the servo-controlled electrohydraulic type, for moving the links to the desired, or programmed, command positions which in turn reduce the positional error signals to zero. Thus, the links of the work-performing robot of FIG. 1 are driven through the programmed sequence of desired motions, or command positions, utilizing closed-loop servo techniques, by periodically comparing desired position command signals retrieved from the memory of the robot controller with actual link position signals from their associated position transducers, and using the resulting positional error signals associated with the different links to drive the various link actuators to the desired, or programmed, command positions.

Figure 4A:
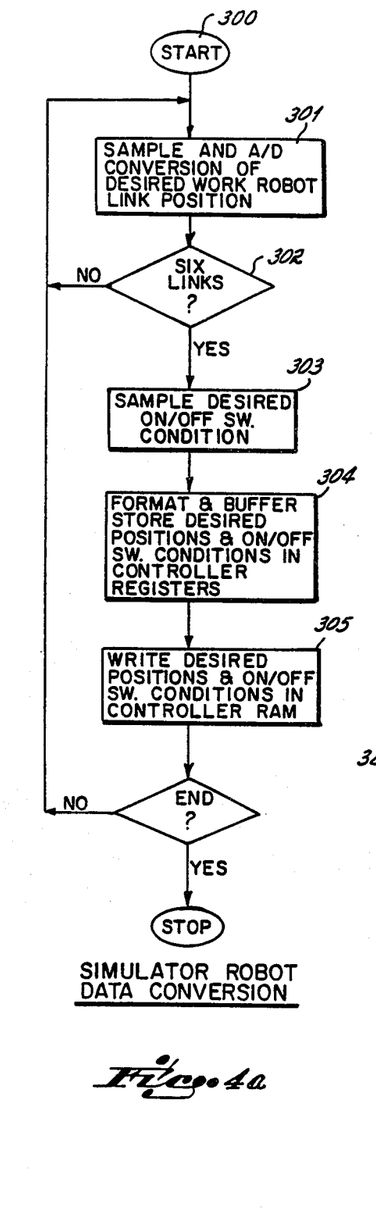
FIGS. 4a and 4b are flow charts of an illustrative form of robot system with which this invention is useful.

Since the robot controller, actuators, position transducers, closed-loop servo controls, and the like of the work-performing robot of FIG. 1 are well known and form no part of this invention, they are not further discussed in detail herein, except to the extent necessary to an understanding of the flow charts of FIGS. 4 and 5.

Figure 2:
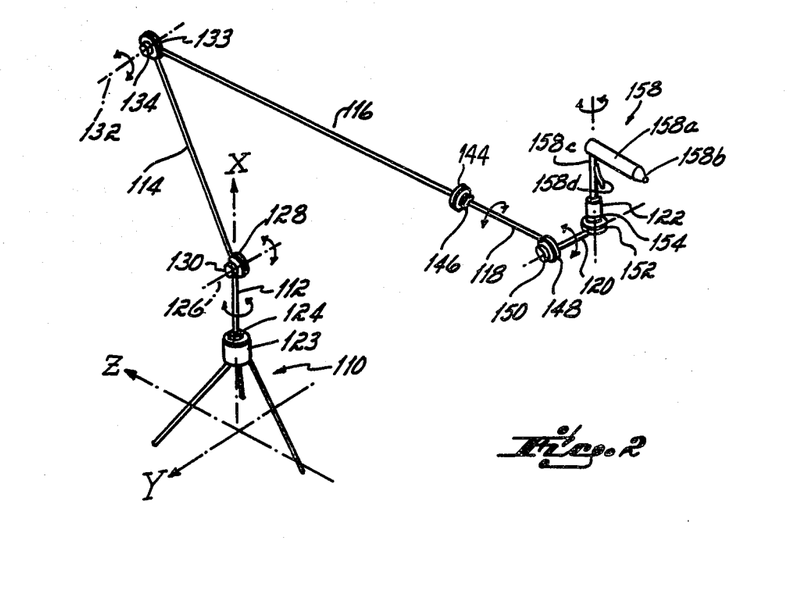
FIG. 2 is a perspective view, in schematic form, of a lightweight, hand manipulable simulator robot, or training arm, showing the general relationship of the simulator links and associated position transducers.

The robot simulator, or training arm, shown in FIG. 2, which is useful in preparing a programmed sequence of motions for input to the work robot for execution thereby relative to a workpiece, includes a tripod base 110 from which extends vertically a link 112 which is connected to the base for rotational movement about a vertical axis by a rotary joint 123. A position transducer 124 associated with the link 112 and base 110 provides an electrical signal correlated to the actual angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the actual angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the actual angular position of the link 116 with respect to the link 114.

Also included in the robot simulator depicted in FIG. 2 are links 118, 120, and 122 which are pivotally connected to links 116, 118, and 120, respectively, via rotary joints 144, 148, and 152, respectively. Angular position transducers 146, 150, and 154 associated with the rotary joints 144, 148, and 152, respectively, and the links 118, 120, and 122, respectively, provide electrical signals correlated to the actual angular position of the links 118, 120, and 122 with respect to the links 116, 118, and 120, respectively.

Mounted to the link 122 is a spray gun 158 having a barrel 158a, a nozzle 158b, and a handle 158c which mounts an ON/OFF switch 158d.

The length of the links 112, 114, 116, 118, 120, and 122 of the simulator robot of FIG. 2 are identical to the lengths of the links 12, 14, 16, 18, 20, and 22, respectively, of the work-performing robot shown in FIG. 1. Of course, the mass of the links 112, 114, 116, 118, 120, and 122 of the simulator robot of FIG. 2 are a mere fraction of that of their counterpart links 12, 14, 16, 18, 20, and 22 of the considerably more massive work-performing robot shown in FIG. 1. Similarly, the joints 123, 128, 133, 144, 148, and 152 of the simulator robot permit the same type of pivotal motion between their respectively associated links 112, 114, 116, 118, 120, and 122 as their counterpart rotary actuators 23, 28, 33, 44, 48, and 52 provide for their respectively associated links 12, 14, 16, 18, 20, and 22 of the work-performing robot.

When the spray gun 158 is moved manually by an operator grasping the handle 158c thereof through a sequence of motions necessary to spray coat an object, which is possible due to its lightweight construction, the various links 112, 114, 116, 118, 120, and 122 of the simulator robot move through a sequence of motions. Simultaneously, the transducers 124, 130, 134, 146, 150, and 154 of the simulator robot associated with the various simulator robot links 112, 114, 116, 118, 120, and 122 provide electrical outputs corresponding to the actual sequence of positions, or motions, through which the simulator robot links move in the course of manually moving the gun through the positions necessary to coat the object. These transducer signals corresponding to the actual positions of the different simulator robot links can be input directly to the robot controller memory or recorded by any suitable means (not shown in FIG. 2) and thereafter the recorded signals input to the robot controller of the work-performing robot where they are compared with signals correlated to the actual work robot link positions and link position error signals derived for input to the work robot link actuators to cause the work robot links to reproduce the motion of the simulator robot links in the manner previously described.

In the course of moving the gun 158 associated with the simulator robot through the sequence of motions necessary to spray coat the desired object, the operator periodically manually actuates the trigger 158d to permit spray coating material from the gun nozzle 158b. By recording signals corresponding to the position of switch 158d in conjunction with recording the position signals provided by the actual position transducers 124, 130, 134, 146, 150, and 154 of the simulator robot for the entire sequence of motions of the simulator robot links 112, 114, 116, 118, 120, and 122 produced by manual manipulation by the operator of the gun 158, a sequence of coordinated gun switch command signals and desired robot link position signals can be stored. These stored signals can then be input to the robot controller and stored, and subsequently repetitively read out from storage within the robot controller and used for repeating the programmed sequence of motions with the work-performing robot of FIG. 1 to coat the object with gun 58, which sequence of motions was first performed manually by the operator with the simulator robot and gun 158.

The rotary actuators 23, 28, 33, 44, 48, and 52 of the work-performing robot shown in FIG. 1 are typically of the hydraulic type, each including an electrohydraulic servo-valve for controlling the rate and direction of flow of hydraulic fluid therethrough.

Associated with the simulator robot and work robot of an illustrative robot system with which this invention is useful is a robot controller 200, which preferably is a specially programmed microprocessor. The robot controller 200 includes a random access memory (RAM) for storing a programmed sequence of desired or command positions for driving the various work robot links 12, 14, 16, 18, 20, and 22, as well as suitable buffer storage registers for temporarily storing the actual and desired positions of the work robot links and the computed positional errors therebetween which result when the work robot is input with, that is, driven by, the programmed sequence of desired positions stored in the robot controller RAM. Also included in the robot controller 200 are computing means for comparing desired work robot link positions and actual work robot link positions temporarily stored in the buffer registers and deriving in response thereto work robot link position error signals for input to the link actuators 23, 28, 33, 44, 48, and 52 of the work robot. During program generation, teaching or training, signals correlated to the desired work robot link positions 200 from simulator robot transducers 124, 130, 134, 146, 150 and 154 are input to the robot controller on lines 202 via an analog-to-digital converter 203 connected via lines 204 to the simulator robot position transducers. During program execution or playback, signals correlated to the actual work robot link positions from work robot position transducers 24, 30, 34, 46, 50 and 54 are input to the robot controller on lines 205 via an analog-to-digital converter 206 connected via lines 207 to the work robot position transducers, while the work robot link position error signals computed by the robot controller are output to the respective link actuators 23, 28, 33, 44, 48, and 52 of the work robot on lines 207 via a digital-to-analog converter 209 which receives the link position error signals on output lines 210.

The robot controller RAM also stores signals correlated to the desired condition of the ON/OFF switch 58d of the work robot. These ON/OFF switch condition signals are input during program generation to the robot controller RAM on line 211, and are output during program execution from the RAM to the ON/OFF switch 58d of the work robot on line 212.

In a given robot system, both during program recording or training with the simulator robot and program execution or replay by the work robot, the controller 200 processes position command signals at a specific rate, which may be constant or vary with time and/or which may be the same or different during program recording and program execution. For example, and assuming during program execution there is no interpolation by the controller 200 and no relative movement between the object being coated by the robot and the work station whereat the robot is located, the controller position command signal processing rate will be the same during both program recording and program execution. Thus, if there are six robot axes, during program recording the robot controller will sample and store in RAM for each simulator robot axis S simulator robot link position transducer signals (desired positions) per second. Similarly, during program execution the controller will, S times per second for each axis, fetch from RAM a position command (desired position), sample the work robot actual link position, and compute therefrom a position error signal for output to the link actuator. In a typical situation, S is 32, although other controller processing rates can be used if desired.

If interpolation is employed by the controller 200 during program execution to compute additional position commands between a pair of sequential position commands stored in RAM, the number of position commands per axis per second issued to the work robot will be greater than the number of position signals from the simulator robot sampled and recorded by the controller per second per axis.

If there is relative motion between the object being sprayed and the robot work station during program recording and program execution, the position command processing rate of the controller 200 may vary with time if the speed of the conveyor transporting the article being coated is varying with time and it is used to control the rate at which the controller fetches position commands (desired position) from RAM, samples the work robot actual link positions, and computes therefrom position error signals for output to the link actuators of the work robot.

For convenience, during program execution, the rate per axis, at which the controller 200 fetches commands from RAM, samples work robot actual link positions, and computes therefrom position error signals for output to the work robot link actuators is referred to herein as the "controller command processing rate". In practice, the rate during program recording at which the controller 200 samples and stores in RAM the ON/OFF signals output from simulator robot switch 158d, and the rate the controller during program execution fetches from RAM and issues to the work robot ON/OFF switch 58d, the stored ON/OFF signals, are equal to each other as well as to the rate per axis at which the controller during program execution fetches position commands from RAM, samples work robot link actual positions, and computes therefrom position error signals for output to the work robot link actuators.

Assuming it is desired to record a programmed sequence of motions with respect to a workpiece for subsequent execution or replay by the work robot, the workpiece is located at the site of the simulator robot. An operator manipulates the simulator robot through the desired sequence of motions with respect to the workpiece. While the operator is manipulating the simulator robot, the outputs of the link position transducers 124, 130, 134, 146, 150 and 154 of the respective simulator robot links are input to the controller 200 via the A/D converter 203 where they are sampled, buffered and recorded in RAM. Additionally, the condition of the robot simulator ON/OFF switch 158d is input to the controller 200 on line 211 for sampling buffering and recording in RAM. This data collection step 301 is shown in the flow chart depicted in FIG. 4a.

More specifically, the desired analog link position signals on line 204 from the simulator robot are sampled and converted from analog to digital form in the analog/digital converter 203. The analog/digital converter 203 converts the inputs thereto which are in analog form to digital form on a time division multiplex basis. Upon the conclusion of the conversion from analog to digital of a single set of desired link position signals (steps 301 and 302), with a "set" consisting of one desired link position signal per link, the simulator robot ON/OFF switch condition signal on line 211, which is in digital form, is sampled in step 303. The digitized set of desired link position signals and the digital ON/OFF switch condition signal are input to the controller 200 via lines 202 and 211 where they are buffer stored in controller registers and, if necessary, reformatted in step 304 to be compatible with the robot controller 200. A "set" of link position signals and an ON/OFF switch condition signal are collectively referred to thereafter as a "group". The digitized, and if necessary reformatted group of desired link position and ON/OFF switch condition signals are then transferred to the controller RAM in step 305. Once this has been done for a single group of desired link position and ON/OFF switch condition signals, the process is repeated for the next group of desired link position and ON/OFF switch condition signals output from the simulator robot. When all groups of desired link position and ON/OFF switch condition signals output from the simulator robot have been sampled, and/or converted from analog to digital by the analog/digital converter 203, reformatted if necessary, and transferred from the controller buffer registers to the controller RAM, the data collection and storage phase shown in the flow chart depicted in FIG. 4a, which occurs during program recording, is complete.

Figure 4B:
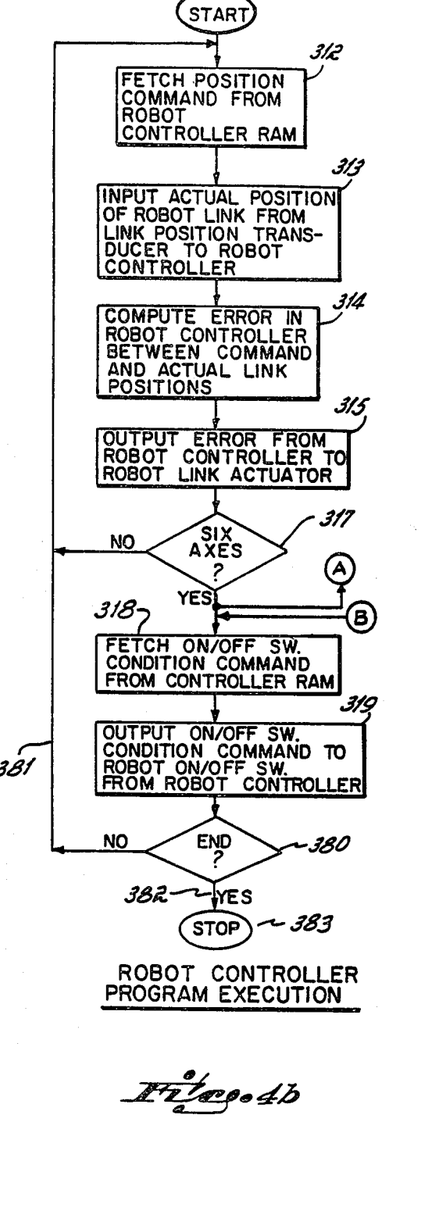

Following reading, reformatting if necessary, and storage in the controller RAM of all groups of desired link position and ON/OFF switch condition signals output from the recorder 201, the work robot drive phase, or program execution or replay, may be initiated in step 300, as shown in the flow chart of FIG. 4b. The steps 312-319 shown in the flow chart of FIG. 4b are sequentially repeated, at the controller command processing rate, for each group of desired link position and ON/OFF switch condition signals until all groups of a program stored in the controller RAM are executed. Considering only one group of desired work robot link positions and ON/OFF switch condition signals, the robot controller program execution step is now described. Specifically, the desired work robot link position for the first link of the group is retrieved in step 312 from the robot controller RAM. The actual position of the work robot link in question is input via its respective line 207 and A/D converter 206 to the robot controller buffer register in step 313. The desired and actual work robot link positions are then compared and a work robot link position error for that particular link is computed by the robot controller in step 314. The work robot link position error signal is output via its respective line 210 to its respective work robot link actuator in step 315 via D/A converter 209 to position the work robot link.

The foregoing steps 312-315 are repeated in step 317 for each desired work robot link position signal of a group, there being as many desired work robot link position signals in a group as there are work robot links. When all desired work robot link position signals in the group have been processed in the manner indicated, the desired ON/OFF switch condition signal of the group is retrieved in step 318 from the robot controller RAM and transferred in step 319 to the ON/OFF switch 58d of the work robot via line 212, completing the execution of the robot controller program for a single group of desired work robot link position and ON/OFF switch signals. The steps 312-319 of the flow chart shown in FIG. 4b are repeated for each group of desired work robot link position and ON/OFF switch condition signals until all groups of desired work robot link position and ON/OFF switch condition signals have been input to the work robot to drive it through the desired sequence of motions which were programmed with the simulator robot at the workpiece site and stored in the controller RAM during the program recording phase. When this has occurred, the subroutine terminates at step 383. The execution rate for each group of desired work robot link position commands and ON/OFF switch commands is the "controller command processing rate" heretofore defined.

Operation of the robot controller 200 at all times is under control of a main, or supervisory, program which, in addition to controlling, recording and executing a sequence of desired link positions stored in RAM, is also operative to facilitate such things as: turn-on and turn-off of the entire robot system when an appropriate POWER ON/OFF switch (not shown) is activated, continuous monitoring of hydraulic pressure levels in all work robot link actuators, orderly interruption of execution of a stored sequence of link positions by the work robot when a STOP button (not shown) is actuated, control of the orderly flow of data between the various components of the controller (RAM, buffers, etc.) and/or between the work and simulator robots and the controller, effecting various diagnostic, interlock and safety routines, etc. The main or supervisory program is interrupted, as necessary, to accomplish the routines and subroutines shown in FIGS. 4 and 5, as well as the various illustrative functions noted above, in accordance with techniques well known in the art, and therefore is not further discussed herein.

Figure 3:
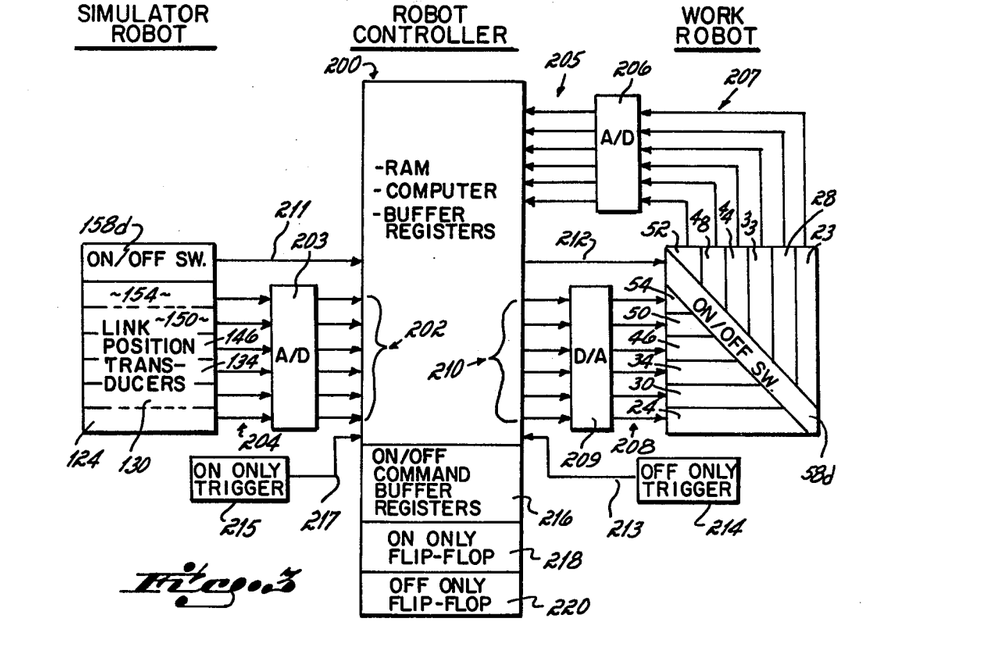
FIG. 3 is a circuit diagram in block format of a preferred embodiment of the invention.

To facilitate editing of ON/OFF commands of a program stored in the RAM of the robot controller 200, an ON ONLY trigger switch means 215 and an OFF ONLY trigger switch means 214 are provided, as shown in FIG. 3. When the ON ONLY trigger 215 is activated, which is under manual control of the operator doing the program editing, an "on" signal, such as a logical "1" signal, is input on line 217 to the robot controller 200. When the ON ONLY trigger 215 is deactivated, the signal on line 217 reverts to an "off" signal, such as a logical "0". Similarly, when the OFF ONLY trigger 214 is activated, which is also under manual control of the operator, an "off" signal, such as a logical "1" is input on line 213 to the robot controller 200. When the OFF ONLY trigger 214 is deactivated, the signal on line 213 reverts to an "off" level, such as a logical "0".

The robot controller 200 is provided with an ON/OFF command buffer register 216, as shown in FIG. 3. This register temporarily stores ON/OFF commands of a prerecorded program stored in the controller RAM. During program processing by the robot controller, the ON/OFF commands are sequentially fetched from the controller RAM and sequentially temporarily stored in the ON/OFF command buffer register 216 for reasons to become apparent hereafter.

Also included, as shown in FIG. 3, is an "ON ONLY" flip-flop 218 and an "OFF ONLY" flip-flop 220. The "ON ONLY" flip-flop 218 is set to an ON state when the ON ONLY trigger 215 has been activated and the ON/OFF command stored in the ON/OFF buffer 216 is an "on" command with the immediately preceding ON/OFF comand having been an "off" command. The ON ONLY flip-flop 218 is reset to an OFF condition whenever an ON/OFF command is being processed by the controller for execution by the robot and the ON ONLY trigger 215 is deactivated. The purpose of the ON/OFF flip-flop will become more readily apparent hereafter. The OFF ONLY flip-flop 220 is placed in its ON condition when the OFF ONLY trigger 214 is activated and the ON/OFF command of a program being processed in the controller for execution by the robot has changed from "on" to "off" since the preceding command. The OFF ONLY flip-flop 220 is reset to its OFF condition when an ON/OFF command is being processed by the controller for execution by the robot and the OFF ONLY trigger 214 is deactivated. The function and operation of the OFF ONLY flip-flop 220 will become more apparent hereafter.

In the illustrations discussed hereafter, it is assumed that activation and deactivation of switches 215 and 214 occur at the very beginning of a command processing cycle such that it is immediately effective for the command being processed.

The operation of the invention will now be described with respect to FIGS. 5 and 6. More specifically, the "ON ONLY" aspect of the invention will be described in connection with FIG. 6a which is a schematic representation of the ON/OFF commands $N_1, \ldots N_n$ of a prerecorded program stored in the RAM of the controller, and in connection with the flow chart of FIG. 5a. As is apparent from FIG. 6a the first command $N_1$ of the stored program is an "off" command. Similarly, the commands between commands $N_1, \ldots N_{b-1}$ are "off" commands, as are the commands $N_c, \ldots N_{d-1}$, command $N_e, \ldots N_{h-1}$, commands $N_i, \ldots N_{k-1}$, and commands $N_L, \ldots N_n$. The command $N_b, \ldots N_{c-1}$ are "on" commands, as are the commands $N_d, \ldots N_{e-1}$, commands $N_h, \ldots N_{i-1}$, and commands $N_k, \ldots N_{L-1}$. Assuming the ON/OFF commands of the stored program represented in FIG. 6a are used to control an ON/OFF solenoid flow control valve of a spray gun, an "on" command will energize the solenoid to open the valve and permit pressurized spray coating material to be emitted from the nozzle thereof for coating the article. Similarly, "off" commands will result in de-energization of the solenoid flow control valve in which event pressurized coating material is not emitted from the gun.

In the discussion which follows it is assumed that it is desired to energize the solenoid valve and emit paint from the gun during the command interval $N_a, \ldots N_{b-1}$, during the command interval $N_f, \ldots N_{g-1}$, and during the command interval $N_j, \ldots N_{k-1}$. It is also assumed that the operator in an effort to add paint during the interval for commands $N_a, \ldots N_{b-1}$ activates the ON ONLY trigger 215 simultaneously with processing of the ON/OFF command $N_a$ by the robot controller and deactivates the ON ONLY trigger 215 at some command $N_{d+n}$ located between commands $N_d$ and $N_e$.

Figure 5A:
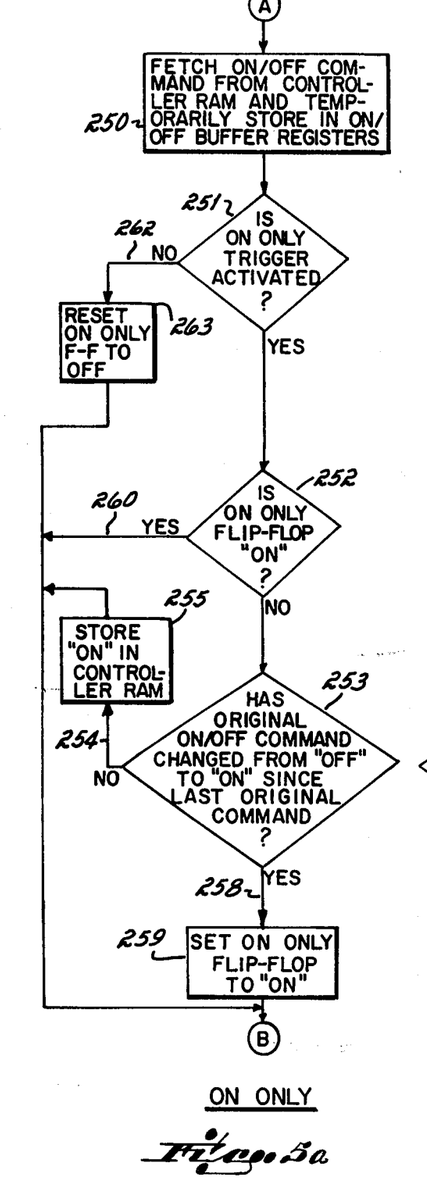
FIGS. 5a and 5b are flow charts of the preferred embodiment of the invention.
Figure 6A:
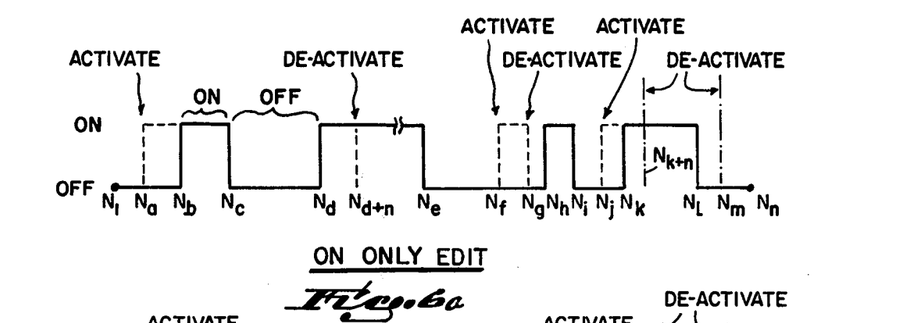
FIGS. 6a and 6b are time plots of the ON/OFF commands versus command (time) for an illustrative robot ON/OFF program designed to spray coat a workpiece.

With reference to the "ON ONLY" subroutine flow chart depicted in FIG. 5a, which is executed between steps 317 and 318 of the robot controller program execution routine flow chart shown in FIG. 4b, it will become apparent that when the robot controller 200 is processing ON/OFF command $N_a$ the robot controller fetches ON/OFF command $N_a$ from the RAM of the controller and temporarily stores it in the ON/OFF buffer register 216 in step 250. The status of the ON ONLY trigger 215 is checked in step 251. Since the ON/OFF switch 215 has been activated the status of the ON ONLY flip-flop 218 is checked. Since the original ON/OFF command $N_a$ presently stored in the buffer register 216 is an OFF command and further since the original ON/OFF command immediately preceding command $N_a$ is also an OFF command, the ON ONLY flip-flop 218 is in an OFF condition. As a consequence, during step 252 when the status of the ON ONLY flip-flop 218 is checked, and found to be in the OFF condition, the subroutine proceeds to step 253 where the original ON/OFF command $N_a$ presently being processed in the RAM controller and temporarily stored in the buffer 216 is compared with the immediately preceding original ON/OFF command $N_{a-1}$. If the original ON/OFF command presently being processed when compared to the original ON/OFF command processed immediately prior thereto does not represent a change from "off" to "on", which is the situation between command $N_a$ and the command $N_{a-1}$ immediately prior thereto, the subroutine proceeds on line 254 to step 255 wherein an "on" is stored in the controller RAM as a substitute for the "off" command $N_a$ which had heretofore been stored in the controller RAM. Thus, in step 255 the ON/OFF command $N_a$ is effectively switched from an OFF command which existed prior to activation of the ON/OFF switch 215 at command $N_a$ to an ON command as a consequence of the activation of the ON ONLY trigger 215 coincident with the processing of command $N_a$ by the robot controller. The ON ONLY subroutine of FIG. 5(a) then proceeds to point B of the robot controller program execution flow chart depicted in FIG. 4b where the newly substituted ON command $N_a$ now in the controller RAM is fetched (step 318) and output to the ON/OFF switch of the robot controller (Step 319) for execution by the robot. Thus, not only has the original command $N_a$ been modified and stored in the controller RAM, but the modified command $N_a$ has been executed by the robot.

In connection with the comparison of the original command currently being processed and the immediately preceding original command, which occurs in step 253, by the term "original command" is meant the command as originally stored in the controller RAM prior to modification, if any. Since the immediately preceding original command may have been modified, when such modification occurs, the command in its original form must be buffer stored for one command processing cycle to permit comparison in step 253 with the succeeding original command fetched from RAM during processing of such succeeding command.

When point A in the robot controller program execution routine of flow chart of FIG. 4b is again reached, the ON ONLY subroutine depicted in FIG. 5a will again be entered. Since it is assumed that the ON ONLY trigger 215 remains activated during the interval between command $N_a$ and command $N_b$ (as well as between commands $N_b$ and $N_{d+n-1}$), when the ON ONLY subroutine of FIG. 5a is next executed between flow chart points A and B, an ON command will be stored in the RAM controller as a substitute for the "off" command heretofore existing for ON/OFF command $N_{a+1}$ (step 255). Again, when the subroutine of FIG. 5a terminates at point B and the robot controller program execution routine flow chart of FIG. 4b is entered at point B, the "on" command $N_{a+1}$ now stored in the controller RAM will be fetched (step 318) and output to the robot for execution (step 319). Thus, not only is the new "on" command $N_{a+1}$ substituted for the old "off" command $N_{a+1}$, but the new "on" command $N_{a+1}$ is executed by the robot.

The processing of commands $N_{a+2} \ldots N_{b-1}$ is identical to the processing of commands $N_a$ and $N_{a+1}$ heretofore described. Thus, during the command interval $N_a$, ... $N_{b-1}$ when the ON ONLY trigger 215 is activated, "on" commands are substituted in the RAM controller for the "off" commands heretofore existing, and further such new "on" commands are output to the robot for execution.

When the command $N_b$ is reached and the ON/Off command $N_b$ temporarily stored in the buffer register 216, which command is an "on" command, which occurs when the subroutine of FIG. 5a is next being executed, particularly step 253 thereof, the subroutine will not proceed on line 254 to step 255 and substitute an "on" command for an "off" command, but rather will proceed on line 258 to step 259. In step 259 the ON ONLY flip-flop 218 is set to an "on" condition whereupon the subroutine of FIG. 5a exits at point B to the robot controller program execution routine of FIG. 4b. At this point the ON/OFF command $N_b$, which is an "on" command, command $N_b$ not having been changed, is fetched from the RAM (step 318) and output to the robot (step 319) for execution.

When command $N_{b+1}$ is being executed by the controller, and the subroutine of FIG. 5a has reached step 252, the subroutine will proceed from step 252 on line 260 to exit the subroutine at point B, bypassing steps 253 and 255. Since step 255 has been bypassed, as it was in the preceding step when command $N_b$ was being processed, the command $N_{b+1}$ is not changed in the robot controller RAM and the original "on" command $N_{b+1}$ is fetched from the controller RAM in step 318 and output to the robot for execution in step 319.

The processing of commands $N_{b+2}, \ldots N_{c-1}$ is identical to the processing of command $N_{b+1}$. That is, the original commands $N_{b+2}, \ldots N_{c-1}$, which are "on" commands, are not changed by execution of the subroutine of FIG. 5a, but are retrieved in modified form from the robot controller (step 318) and output to the robot for execution (step 319). Similarly, the "off" command $N_c, \ldots N_{d-1}$, which remain unmodified by execution of the subroutine of FIG. 5a, are retrieved from the RAM controller in unmodified form (step 318) and output to the robot for execution (step 319). The commands $N_{b+2}, \ldots N_{c-1}$ are not changed to "off" commands, and commands $N_c, \ldots N_{d-1}$ are not changed to "on" commands, since the step 255 of the ON ONLY subroutine in FIG. 5a is bypassed each time this subroutine is executed for commands $N_{b+1}, \ldots N_{d-1}$.

Commands $N_d, \ldots N_{d+n-1}$, which are "on" commands, are processed by the controller and executed by the robot as "on" commands since step 255 is bypassed each time the subroutine of FIG. 5a is executed which occurs for every command. Thus, the commands are not modified.

When command $N_{d+n}$ is being processed, which corresponds to the point when the ON ONLY switch 215 is deactivated, step 251 of the ON ONLY subroutine of FIG. 5a exits at line 262 since the ON ONLY trigger is not activated. This causes the ON ONLY flip-flop 218 to be reset to an OFF condition in step 263 whereupon the subroutine exits at point B to the robot controller program execution routine shown in FIG. 4b. The ON/OFF command $N_{d+n}$, which is an "on" command, is fetched from the controller RAM (step 318), and output for execution by the robot (step 319). The processing of commands $N_{d+n+1}, \ldots N_{e-1}$ is identical to command $N_{d+n}$.

Had the ON ONLY trigger 215 been deactivated at some point between commands $N_b$ and $N_{c-1}$, an "on" command would have been written into the memory for all commands between the command at which the ON ONLY trigger is deactivated and command $N_{c-1}$. However, this would not have changed the stored program commands since during such interval the stored ON/OFF commands are "on".

For the purpose of illustration, it is now assumed that the ON ONLY trigger 215 is manually activated coincident with the processing of command $N_f$ by the robot controller and is maintained in an activated state until command $N_g$ is being processed. When the robot controller program execution routine of FIG. 4(b) reaches point A in the ON ONLY subroutine flow chart of FIG. 4b, the command $N_f$ is fetched from the controller RAM and temporarily stored in the ON/OFF buffer 215 in step 250. The status of the ON ONLY trigger 215 is checked in step 251 and found to be activated. The subroutine proceeds to step 252 and the status of the ON ONLY flip-flop 218 is checked. The ON ONLY flip-flop 252 is in the OFF state, having been placed in this state during the processing of the preceding command $N_{f-1}$ when step 251 exited on line 262 because the ON ONLY switch 215 was then deactivated, causing the ON ONLY flip-flop 218 to be set to the OFF condition in step 263. Since the ON ONLY flip-flop 218 is in an OFF condition in step 252 during the processing of command $N_f$, the subroutine proceeds to step 253 to determine if the ON/OFF command has changed from "off" to "on" from command $N_{f-1}$ to command $N_f$. Since such a change has not yet occurred, both the original command $N_f$ now stored in the buffer register 216 and the original command $N_{f-1}$ prior thereto are "off" commands, the subroutine proceeds along line 254 to step 255. In step 255 an "on" command is stored in the robot controller RAM for command $N_f$, thereby effectively substituting for command $N_f$ an "on" command for the original "off" command. The ON ONLY subroutine of FIG. 5(a) now exits at point B to the robot controller program execution routine depicted in FIG. 4b. In step 318 the substituted "on" command $N_f$ is fetched from the controller RAM and in step 319 it is output to the robot for execution.

The processing of commands $N_{f+1}, \ldots N_{g-1}$ is identical to the processing of command $N_f$ described above. For each of commands $N_{f+1}, \ldots N_{g-1}$ an "on" command is substituted in the robot controller for the original "off" command and the modified "on" command is output to the robot controller for execution. When the robot controller is processing command $N_g$, which is an "off" command, the "off" command is temporarily stored in the buffer register in step 250. The ON ONLY subroutine now proceeds to step 251 and the status of the ON ONLY trigger 215 is checked. Since the ON ONLY trigger 215 is not activated at command $N_g$, the subroutine proceeds on line 262 to step 263 to reset to the OFF condition the ON ONLY flip-flop 218. The ON ONLY subroutine now proceeds to point B and the robot controller program execution flow chart of FIG. 4b is entered. The original "off" command $N_g$ is fetched from the robot controller RAM in step 318 and output to the robot for execution in step 319.

The processing of commands $N_{g+1}, \ldots$ and $N_{h-1}$ are identical to command $N_g$.

Commands $N_h, \ldots N_{i-1}$, which are "on" commands, are processed in normal fashion, with the subroutine of FIG. 5a being executed prior to the execution of each of the commands $N_h, \ldots N_{i-1}$, but being ineffective to modify the original ON/OFF command. The same is true for commands $N_i, \ldots N_{j-1}$, except that the original commands are "off" commands and are executed as such, that is, without modification.

It is now assumed that the ON ONLY trigger 215 is manually activated coincident with the processing of command $N_j$ by the controller and remains activated until the command $N_k$ is processed by the controller, for the purpose of adding paint during the interval $N_j, \ldots N_{k-1}$. During the processing of command $N_j$ by the robot controller, the original command $N_j$, which is an "off" command, is retrieved from the robot controller and stored in the buffer 216 in step 250. The subroutine of FIG. 5a then proceeds to step 251 and a check is conducted of the status of the ON ONLY trigger 215. Since the ON ONLY trigger 215 is activated the subroutine proceeds to step 252 where the status of the ON ONLY flip-flop 252 is checked. Since the ON ONLY flip-flop 252 is not in an "on" condition, the routine proceeds to step 253. The ON ONLY flip-flop 252 is not in an "on" condition because during the processing of the preceding original command, $N_{j-1}$, the ON ONLY trigger 215 was not activated and the subroutine of FIG. 5a proceeded from step 251 along line 262 to step 263 to reset the ON ONLY flip-flop to an "off" condition. As noted, since the ON ONLY flip-flop is in an "off" condition, the subroutine of FIG. 5a proceeds from step 252 to step 253. In step 253 a check is made to determine if the original command $N_j$ presently being processed, when compared to the preceding original command $N_{j-1}$, represents a change from "off" to "on". Since original command $N_j$ is not different from original command $N_{j-1}$, the subroutine proceeds along line 254 to step 255. In step 255 an "on" command is stored in the controller RAM for command $N_j$, effectively modifying the original command $N_j$, which was an "off" command, to an "on" command. The subroutine of FIG. 5a now exits at point B to the robot controller program execution routine shown in FIG. 4b. The modified command $N_j$, which is now an "on" command, is fetched from the robot controller in step 318 and output to the robot for execution in step 319. Thus, the original command $N_j$ has not only been modified, but the command $N_j$, as modified, has been executed by the robot.

Commands $N_{j+1}, \ldots N_{k-1}$ are processed in a manner identical to command $N_j$.

Assuming the ON ONLY trigger 215 is not deactivated until command $N_{k+n}$, which is located somewhere between commands $N_k$ and $N_l$ during execution of the subroutine of FIG. 5(a), command $N_k$ is retrieved from the controller robot and stored in the buffer 216 in step 250. In step 251 a check is made to determine the status of the ON ONLY trigger 215, and since it is still activated the subroutine of FIG. 5a proceeds to step 252. The ON ONLY flip-flop 252 is checked and since it is in an "off" condition the subroutine proceeds to step 253. In step 253 the original command $N_k$ is checked against the preceding original command and since the original preceding command $N_{k-1}$ was an "off" command and the original command $N_k$ is an "on" command, the subroutine proceeds from step 253 along line 258 to step 259 and the ON ONLY flip-flop 218 is set to an "on" condition. Since step 255 is bypassed for command $N_k$, when the subroutine of FIG. 5a exits at point B and returns to the robot controller program execution routine of FIG. 4b, the original command $N_k$, which is an "on" command, is fetched from the controller RAM and output to the robot for execution in step 319.

During the next execution of the subroutine of FIG. 5(a), when the next command $N_{k+1}$ is fetched and stored in the buffer 216 in step 250, the subroutine proceeds to step 251. In step 251 a check is made of the status of the ON ONLY trigger 215, which is found to be in the activated state The subroutine of FIG. 5a proceeds to step 252 where a check of the status of the ON ONLY flip-flop 218 is made. Since the ON ONLY flip-flop 218 is now in the "on" condition, the subroutine proceeds on line 260 to point B where the robot controller program execution routine of FIG. 4b is entered. The original command $N_k$ is retrieved from the robot controller RAM in step 318 and output to the robot for execution in step 319. Commands $N_{k+2}, \ldots N_{k+n-1}$ are identical to the processing of command $N_{k+1}$.

Assuming the ON ONLY trigger 215 is deactivated coincident with the processing of command $N_{k+n}$ by the robot controller, command $N_{k+n}$ is fetched in step 250 during the execution of the subroutine of FIG. 5(a) and placed in the buffer 216. The subroutine of FIG. 5(a) proceeds to step 251 and a check of the status of the ON ONLY trigger 215 is made. The ON ONLY trigger 215 is now in a deactivated condition so the subroutine proceeds on line 262 to step 263 wherein the ON ONLY flip-flop 218 is reset to an "off" condition. The subroutine now proceeds to point B and the robot controller program execution routine of FIG. 4b is reentered. The command $N_{k+n}$, which is an "on" command, is fetched from the robot controller RAM in step 318 and output to the robot for execution in step 319. Thus, and notwithstanding deactivation of the ON ONLY trigger 215, the original command $N_{k+n}$, which is an "on" command, is executed by the robot.

The execution of commands $N_{k+n+1}, \ldots N_{l-1}$ proceeds in the same manner as the execution of command $N_{k+n}$. The execution of commands $N_1, \ldots N_n$ proceeds in the same manner as the execution of commands $N_{k+n} \ldots N_1$, except that the original command executed is an "off" command rather than an "on" command.

If instead of deactivating the ON ONLY trigger 215 at command $N_{k+n}$, the ON ONLY trigger had been deactivated at some command $N_m$ between command $N_1$ and command $N_n$, processing of the commands $N_1, \ldots N_{m-1}$ would have proceeded in the subroutine of FIG. 5a to step 252 whereupon the subroutine would have exited on line 260 to point B. This is in contrast to the previously described situation wherein it was assumed that the ON ONLY trigger was deactivated at command $N_{k+n}$ such that the processing of commands $N_1, \ldots N_{m-1}$ proceeded in the subroutine of FIG. 5a to step 251 and exited on line 262 to reset the ON ONLY flip-flop to an "off" condition in step 263.

From the foregoing discussion of the ON ONLY trigger 215, it is apparent that coating material can be added by activating the ON ONLY trigger, and the paint will cease to be added when ON ONLY trigger is released, providing there is no intervening "on" command. If between activation and deactivation of the ON ONLY trigger there is an intervening "on" command, activation of the ON ONLY switch will be effective to add paint only between the time of activation and the intervening "on" command. Thus, failure to release the ON ONLY trigger 215 until after passage of one or more "on/off" transitions will not result in adding paint during the "off" commands occurring after such "on/off" transitions. Stated differently, regardless of when the ON ONLY trigger 215 is released, assuming it is released after a succeeding "on/off" transition, such release will only be effective to add paint between the point where activated and the first "off/on" transition.

Moreover, it is also apparent that the ON ONLY aspect of this invention is effective to not only modify an "off" command to an "on" command, but it is effective to store such modified command in the controller RAM and execute it in the robot on a real time basis.

Figure 6B:
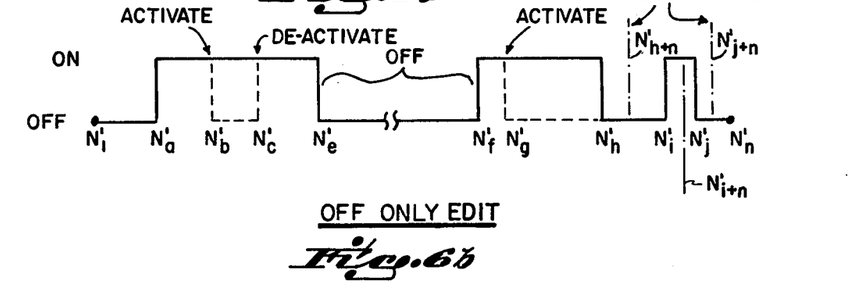

FIG. 6b schematically shows the ON/OFF commands $N'_1, \ldots N'_n$ of a program stored in the controller RAM for an ON/OFF device such as the flow control solenoid valve of a spray gun. As is apparent from FIG. 6b ON/OFF commands $N'_a, \ldots N'_{e-1}$ are "on" commands, as are commands $N'_f, \ldots N'_{h-1}$ and commands $N'_i, \ldots N'_{j-1}$. The ON/OFF commands are "off" for commands $N'_1, \ldots N'_{a-1}$, as well as for commands $N'_e, \ldots N'_{f-1}$ and commands $N'_h, \ldots N'_{i-1}, \ldots$ and $N'_j, \ldots N_n$.

Figure 5B:
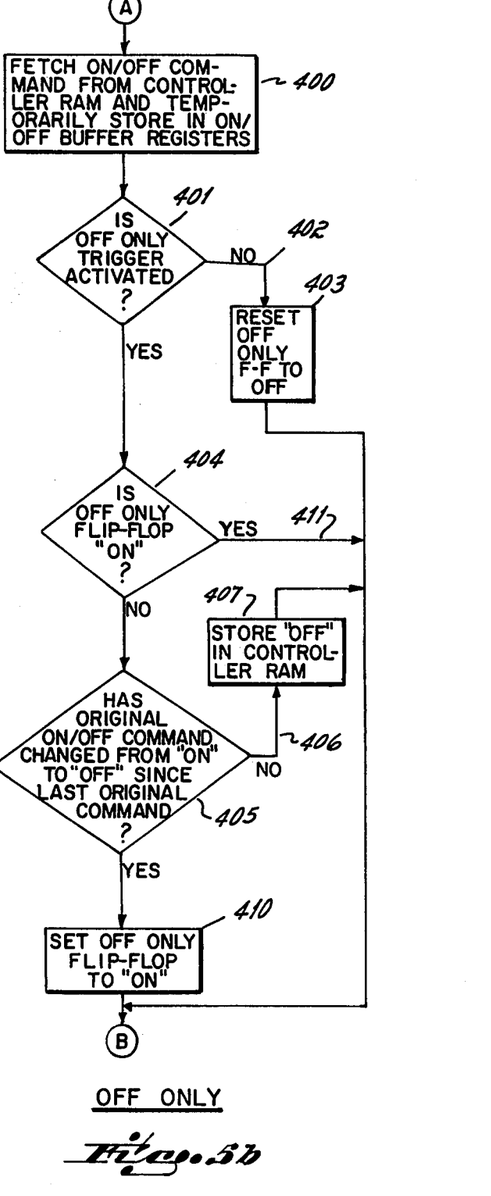

Assuming it is desired to modify the program schematically depicted in FIG. 6b such that the flow control solenoid valve of the spray gun 58 is deenergized to prevent the emission of spray coating material from the gun during the command interval $N'_b \ldots N'_c$, the OFF ONLY trigger 214 is activated concurrently with the processing of command $N'_b$ by the robot controller and is maintained in an activated condition until after the processing of command $N'_c$ by the controller. With reference to FIG. 5b, which is a flow chart of the OFF ONLY subroutine, the processing of a typical "off" command and a typical "on" command prior to command $N_b'$ is discussed.

Specifically, when the robot controller program execution routine depicted in FIG. 4 reaches point A, the OFF ONLY subroutine depicted in FIG. 5b is entered. Assuming the control processor is processing command $N'_1$, which is an "off" command, the command $N'_1$ is fetched from the robot controller RAM and temporarily stored in the buffer 216, which occurs in step 400. The subroutine of FIG. 5b proceeds to step 401 where the status of the OFF ONLY trigger 214 is checked. Since the OFF ONLY trigger 214 is not activated coincident with the processing of command $N'_1$, the OFF ONLY subroutine proceeds on line 402 to step 403 to reset the OFF ONLY flip-flop 220 to the "off" condition. Following this, the OFF ONLY subroutine proceeds to point B and the robot controller program execution routine of FIG. 4b is entered. The command $N'_1$ is fetched from the robot controller RAM in step 318 and output to the robot for execution in step 319. The processing of commands $N'_{1+1}, \ldots N'_{a-1}$ is identical to the processing of command $N'_1$ just described. Thus, commands $N'_1, \ldots N'_{a-1}$, which are "off" commands, are executed by the robot without modification, that is, unedited.

During the processing of command $N'_a$ by the robot controller, when the robot controller program execution routine in FIG. 4b reaches point A, the OFF ONLY subroutine of FIG. 5b is entered. The command $N'_a$ is fetched from the robot controller RAM and temporarily stored in the buffer 216 during step 400. The subroutine proceeds to step 401 where the OFF ONLY trigger activation state is checked. Since the OFF ONLY trigger 216 is not yet activated, the subroutine proceeds along line 402 to step 403. The OFF ONLY flip-flop is already in the "off" condition and the subroutine proceeds to point B at which time the robot controller program execution routine of FIG. 4b is reentered. The command $N'_a$, which is an "on" command, is fetched in step 400 and stored temporarily in the buffer 216. The subroutine proceeds to step 401 and the status of the OFF ONLY trigger 214 is checked. Since the OFF ONLY trigger has not yet been activated, the subroutine proceeds along line 402 to the step 403. Since the OFF ONLY flip-flop 220 is in an "off" condition, its status is not changed and the subroutine proceeds to point B. At point B the robot controller program execution routine of FIG. 4b is reentered and the command $N'_a$, which is an "on" command, is fetched from the controller RAM in step 318 and output for execution by the robot in step 319. Commands $N'_{a+1}, \ldots N'_{b-1}$ are processed identically with command $N'_a$; and all such commands, which are "on" commands, are executed by the robot without modification, that is, unedited.

Assuming the OFF ONLY trigger 214 is activated coincident with command $N'_b$, when the robot controller program execution routine of FIG. 4b reaches point A, the OFF ONLY subroutine of FIG. 5b is entered. The original command $N'_b$ is retrieved from the controller RAM and temporarily stored in the buffer 216. The subroutine then proceeds to step 401 where the status of the OFF ONLY trigger 214 is checked. Since the OFF ONLY trigger 214 is in an activated state, the routine proceeds to step 404 where the status of the OFF ONLY flip-flop 220 is checked. Since the OFF ONLY flip-flop is in an "off" condition, the subroutine proceeds to step 405 where a determination is made whether original command $N'_b$ when viewed with respect to previous original command $N'_{b-1}$ has effectively changed from "on" to "off". Since the original command $N'_b$ and original command $N'_{b-1}$ are identical, the subroutine proceeds along line 406 to step 407. In step 407 an "off" command is stored in the controller RAM as a substitute for original command $N'_b$ which was an "on" command. The subroutine of FIG. 5b now proceeds to point B where the robot controller program execution routine of FIG. 4b is entered. The robot controller now functions to fetch from the controller RAM the modified command $N'_b$, which is an "off" command, (step 318) and outputs to the robot for execution the modified command $N'_b$. Thus, command $N'_b$ has not only been modified, but the command, as modified, has been substituted in the controller RAM for original command $N'_b$ and has been output to the robot for execution, thereby effecting real time editing.

The processing of commands $N'_{b+1}, \ldots N'_c$ is identical to the processing of command $N'_b$. Thus, these commands are edited, and the edited, or modified, commands stored in the controller RAM and executed by the robot.

Coincident with the processing of command $N'_{c+1}$ by the robot controller the OFF ONLY trigger 214 is deactivated. When the robot controller program execution routine of FIG. 4b reaches point A, the OFF ONLY subroutine of FIG. 5b is entered. The original command $N'_{c+1}$ is fetched from the robot controller RAM in step 400 and stored in the buffer register. The subroutine then proceeds to step 401 and the status of the OFF ONLY trigger 214 is checked. Since the OFF ONLY trigger is now deactivated, the subroutine proceeds along line 402 to step 403 wherein the OFF ONLY flip-flop 220 is reset to an "off" condition. The subroutine now proceeds to point B where the robot controller program execution routine of FIG. 4b is entered. The routine proceeds to step 318 where the original command $N'_{c+1}$, which is an "on" command, is fetched and stored in the buffer memory in step 318 and transmitted to the robot for execution in step 319 without modification or editing.

The execution of commands $N'_{c+2}, \ldots N'_{e-1}$ is identical to that of command $N'_{c+1}$. The execution of commands $N'_e, \ldots N'_{f-1}$ is identical to command $N'_e$, except that the original command fetched from the memory in step 318 and output to the robot in step 319 of the routine of FIG. 4b is an "off" command rather than an "on" command. No editing of the commands $N'_{c+2}, \ldots N'_{f-1}$ occurs. The processing of commands $N'_f, \ldots N'_{g-1}$ is identical to that of command $N'_a$. No editing occurs of these "on" commands.

Assuming the OFF ONLY trigger 214 is activated coincident with the processing of command $N'_g$, when the robot controller program execution routine of FIG. 4b reaches point A, the OFF ONLY subroutine of FIG. 5b is entered. The original command $N'_g$, which is an "on" command, is retrieved in step 400 and placed in the buffer. The subroutine then proceeds to step 401 where the OFF ONLY trigger 214 is checked. Since the OFF ONLY trigger 214 is in an activated state, the subroutine proceeds to step 404 where the status of OFF ONLY flip-flop 220 is checked. Since the status of this flip-flop is OFF, the subroutine moves to step 405. The OFF ONLY flip-flop 220 is in an "off" condition because during processing of the preceding original command $N'_{g-1}$, the OFF ONLY trigger was deactivated and the subroutine of FIG. 5b proceeded to reset the OFF ONLY flip-flop 220 to its "off" condition in step 403. In step 405 original command $N'_g$ is checked against the preceding original command $N'_{g-1}$ to see if it has changed. Since there has been no change, the subroutine of FIG. 5b proceeds along line 400 to step 407. In step 407 an "off" command is substituted in the robot controller RAM for command $N'_g$ which had previously been "on". After step 407 the subroutine of FIG. 5b proceeds to point B where the robot controller program execution routine of FIG. 4b is entered. In step 318 the modified command $N'_g$ is retrieved, which is an "off" command, and transmitted in step 319 to the robot for execution. Thus, not only has the command $N'_g$ been modified, but the modified command has been stored in the robot controller RAM and output to the robot for execution on a real time basis.

The processing of commands $N'_{g+1}, \ldots N'_{h-1}$ is identical to command $N'_g$.

During the processing of command $N'_h$ when the robot controller program execution routine of FIG. 4b reaches step A, the subroutine of FIG. 5b is entered. The command $N'_h$ is fetched from the robot controller RAM and temporarily stored in the buffer. This original command $N'_h$ is an "off" command. The subroutine proceeds to step 401 and the status of the OFF ONLY trigger 214 is checked. Since the OFF ONLY trigger 214 is activated, the subroutine proceeds to step 404 where the status of the OFF ONLY flip-flop 220 is checked. Since the OFF ONLY flip-flop 220 is in an "off" condition, the subroutine proceeds to step 405. In step 405 original command $N'_h$ is compared to original command $N'_{h-1}$ and since the original command has changed from "on" to "off" the subroutine proceeds to step 410 where the OFF ONLY flip-flop 220 is set to an "on" condition. The subroutine now proceeds to point B and the robot controller program execution routine of FIG. 4b is entered. The command $N'_h$, which has not been modified by virtue of bypassing step 407 in the immediately preceding execution of the subroutine of FIG. 5b, is fetched in step 318 and output to the robot for execution in step 319.

During the processing of command $N_{h+1}$ when the robot controller program execution routine of FIG. 4b reaches point A, the subroutine of FIG. 5b is entered. The command $N_{h+1}$ in step 400 is fetched from the robot controller and temporarily stored in the buffer. The subroutine proceeds to step 401 where the status of the OFF ONLY trigger 214 is checked. Since the OFF ONLY trigger is still activated, the subroutine proceeds to step 404 where the status of the OFF ONLY flip-flop is checked. Since the OFF ONLY flip-flop is now in the "on" condition, having been placed in such condition in step 410 of the preceding execution of the subroutine of FIG. 5b during the processing of command $N_h$, the subroutine proceeds on line 411 to point B and the robot controller program execution routine of FIG. 4b is entered. The command $N_{h+1}$, which has not been edited, is fetched from the controller RAM in step 318 and input to the robot for execution in step 319.

Commands subsequent to command $N_{h+2}$ are processed identically to command $N_{h+1}$ until the OFF ONLY trigger 214 is deactivated. When this occurs, during the execution of the subroutine of FIG. 5b, the subroutine proceeds from step 401 to step 403 since the OFF ONLY trigger is deactivated. In step 403 the OFF ONLY flip-flop 220 is set to the "off" condition and the subroutine proceeds to point B. Upon reentry of the robot controller program execution routine of FIG. 4b and fetching (step 318) of the command, the original commands stored in the controller RAM, whether "on" or "off", will be output to the robot for execution (step 319). Thus, regardless of whether the OFF ONLY trigger 214 is deactivated coincident with commands $N'_{h+n}$, $N'_{i+n}$, or $N'_{j+n}$, the subroutine of FIG. 5 will proceed to step 404 and exit on line 411 to point B. When the robot controller program execution routine of FIG. 4b is reentered, the original command stored in the controller RAM will be fetched and output to the robot for execution. Thus, as long as deactivation of OFF ONLY trigger 214 occurs after command $N_{h-1}$, which is an "on" command, editing terminates with command $N_{h-1}$.

From the foregoing discussion of the OFF ONLY trigger 214, it is apparent that coating material can be removed by activating the OFF ONLY trigger, and the paint will cease to be removed when the OFF ONLY trigger is released, providing there is no intervening "off" command. If between activation and deactivation of the OFF ONLY trigger 214 there is an intervening "off" command, activation of the OFF ONLY switch will be effective to remove paint only between the time of activation and the intervening "off" command. Thus, failure to release the OFF ONLY trigger 214 until after passage of one or more "off/on" transitions will not result in removing paint during "on" commands occurring after such "off/on" transitions. Stated differently, regardless of when the OFF ONLY trigger 214 is released, assuming it is released after a succeeding "off-/on" transition, such release will only be effective to remove paint between the point where activated and the first "on/off" transition.

Moreover, it is also apparent that the OFF ONLY aspect of this invention is effective to not only modify an "on" command to an "off" command, but it is effective to store such modified command in the controller RAM and execute it in the robot on a real time basis.

While the ON/OFF command editing invention has been described in the preferred embodiment in connection with editing ON/OFF commands for controlling a bistable device in the form of a solenoid flow control valve contained in a spray gun mounted to the output element of a robot, the invention is equally useful in connection with editing ON/OFF commands for bistable devices of other types. Illustrative of another type of bistable device with which the editing of this invention is useful is a solenoid valve which controls the flow of air to a pair of horns located in the spray gun nozzle for changing the fan spray pattern between narrow and wide depending upon whether air is being supplied to the horns or not supplied.

Another type of bistable device with which the editing of this invention is useful in controlling ON/OFF commands is a high voltage electrostatic power supply which energizes a coating-charging electrode in the gun nozzle. In certain spray coating situations, such as spraying inside corners and cracks, it is preferable to spray coat in a nonelectrostatic mode, whereas usually the electrostatic power supply is energized to spray in an electrostatic mode.

The bistable device, the ON/OFF commands of which are being edited, in certain cases may be mounted independent of the robot. For example, the bistable device may be an indexing mechanism which indexes a workpiece being spray coated with a robot-mounted spray gun, with the indexing being rotational, linear, or the like.

Having described the invention, what is claimed is:

1. A controller for concurrently driving an articulated robot link under closed loop servo control and operating a bistable device operating in conjunction with the robot link in response to a stored sequence of recorded link position commands and ON/OFF commands, respectively, the robot link having associated therewith a signal-responsive link actuator and a link position feedback transducer which provides a feedback signal correlated to link position, said controller having real time ON/OFF command editing capability, comprising:

means to store a sequence of recorded robot link position commands and ON/OFF commands,
    means to sequentially retrieve robot link position commands from said storage means,
    means responsive to a retrieved link position command and the link position feedback signal input from the link position feedback transducer for calculating a link position error signal and outputting it to the link actuator to drive the link to a command position,
    means to sequentially retrieve ON/OFF commands from said storage means,
    ON/OFF command editing means, including a manually-activated switch means, for modifying retrieved ON/OFF commands,
    means for effectively substituting said modified ON/OFF commands in said storage means for their respectively associated, previously retrieved, unmodified ON/OFF commands,
    means for inputting, on an interleaved basis, both retrieved ON/OFF commands which were not modified and modified ON/OFF commands, to said ON/OFF device for execution thereby, in the sequence in which said unmodified ON/OFF commands and modified ON/OFF commands were retrieved and modified, respectively, said inputting means being operative substantially concurrently with said retrieving means, calculating means, and modifying means to facilitate simultaneously driving said robot link actuator with said link position error signals to position said link to command positions and actuating said ON/OFF device with said sequence of interleaved modified and unmodified ON/OFF commands, whereby said manually-activated switch means is activated to effectively manually modify ON/OFF commands of a recorded sequence on a real time basis while said controller is processing said recorded sequence of position and ON/OFF commands for execution by said robot.

2. The controller of claim 1 wherein said editing means includes a manually-activated ON ONLY switch means, said editing means being operable upon initial activation of said ON ONLY switch means to place said editing means in a first mode in which sequentially retrieved OFF commands are modified to ON commands, said editing means being operable in a second mode in response to the first OFF-to-ON transition in sequentially retrieved ON/OFF commands following activation of said ON ONLY switch means to not thereafter modify sequentially retrieved OFF commands to ON commands notwithstanding continued activation of said ON ONLY switch means, and said editing means being operable in a third mode in response to deactivation of said ON ONLY switch means prior to said first OFF-to-ON transition to terminate modification of sequentially retrieved OFF commands to ON commands occurring subsequent to deactivation of said ON ONLY switch means, whereby said ON ONLY switch means is effective to modify only OFF commands occurring between initial activation of said ON ONLY switch means and the first to occur of (a) deactivation of said ON ONLY switch means or (b) said first OFF-to-ON transition.

3. The controller of claim 1 wherein said editing means includes a manually-activated OFF ONLY switch means, said editing means being operable upon initial activation of said OFF ONLY switch means to place said editing means in a first mode in which sequentially retrieved ON commands are modified to OFF commands, said editing means being operable in a second mode in response to the first ON-to-OFF transition in sequentially retrieved ON/OFF commands following activation of said OFF ONLY switch means to not thereafter modify sequentially retrieved ON commands to OFF commands notwithstanding continued activation of said OFF ONLY switch means, and said editing means being operable in a third mode in response to deactivation of said OFF ONLY switch means prior to said first ON-to-OFF transition to terminate modification of sequentially retrieved ON commands to OFF commands occurring subsequent to deactivation of said OFF ONLY switch means, whereby said OFF ONLY switch means is effective to modify only ON commands occurring between initial activation of said OFF ONLY switch means and the first to occur of (a) deactivation of said OFF ONLY switch means or (b) said first ON-to-OFF transition.

4. The controller of claim 1 wherein said editing means includes:
a manually-activated ON ONLY switch means, said editing means being operable upon initial activation of said ON ONLY switch means to place said editing means in a first mode in which sequentially retrieved OFF commands are modified to ON commands, said editing means being operable in a second mode in response to the first OFF-to-ON transition in sequentially retrieved ON/OFF commands following activation of said ON ONLY switch means to not thereafter modify sequentially retrieved OFF commands to ON commands notwithstanding continued activation of said ON ONLY switch means, and said editing means being operable in a third mode in response to deactivation of said ON ONLY switch means prior to said first OFF-to-ON transition to terminate modification of sequentially retrieved OFF commands to ON commands occurring subsequent to deactivation of said ON ONLY switch means, whereby said ON ONLY switch means is effective to modify only OFF commands occurring between initial activation of said ON ONLY switch means and the first to occur of (a) deactivation of said ON ONLY switch means or (b) said first OFF-to-ON transition; and a manually activated OFF ONLY switch means, said editing means being operable upon initial activation of said OFF ONLY switch means to place said editing means in a fourth mode in which sequentially retrieved ON commands are modified to OFF commands, said editing means being operable in a fifth mode in response to the first ON-to-OFF transition in sequentially retrieved ON/OFF commands following activation of said OFF ONLY switch means to not thereafter modify sequentially retrieved ON commands to OFF commands notwithstanding continued activation of said OFF ONLY switch means, and said editing means being operable in a sixth mode in response to deactivation of said OFF ONLY switch means prior to said first ON-to-OFF transition to terminate modification of sequentially retrieved ON commands to OFF commands occurring subsequent to deactivation of said OFF ONLY switch means, whereby said OFF ONLY switch means is effective to modify only ON commands occurring between initial activation of said OFF ONLY switch means and the first to occur of (a) deactivation of said OFF ONLY switch means or (b) said first ON-to-OFF transition.

5. A method of editing on a real time basis, ON/OFF commands of a sequence stored in a robot controller for controlling a bistable device operating in conjunction with the robot while the controller is concurrently processing prerecorded position and ON/OFF commands for driving the robot and controlling the bistable device; respectively, comprising the steps of:
sequentially retrieving robot position commands and ON/OFF commands from storage in a controller memory,
calculating, in response to a retrieved position command and a position feedback signal input from a robot position feedback transducer, a position error signal and outputting it to a robot actuator to drive the robot to a command position,
modifying retrieved ON/OFF commands in response to a manually-activated switch means,
effectively substituting said modified ON/OFF commands in said storage means for their respectively associated, previously retrieved, unmodified ON/OFF commands,
inputting, on an interleaved basis, both retrieved ON/OFF commands which were not modified and modified ON/OFF commands, to the ON/OFF device for execution thereby, in the sequence in which the unmodified ON/OFF commands and modified ON/OFF commands were retrieved and modified, respectively, substantially concurrently with the retrieving, calculating, and modifying to facilitate simultaneously driving the robot actuator with the position error signals to position the robot to command positions and actuating the ON/OFF device with the sequence of interleaved modified and unmodified ON/OFF commands, whereby retrieved ON/OFF commands of a recorded sequence are modified on a real time basis in response to manual switch activation while the controller is processing the recorded sequence of position and ON/OFF commands for execution by said robot and robot-mounted device, respectively.

6. The method of claim 5 wherein said modifying step includes:

activating a manually-activated ON ONLY switch means to cause, in response to initial activation of the ON ONLY switch means, sequentially retrieved OFF commands to be modified to ON commands, monitoring the retrieved ON/OFF commands to identify the first OFF-to-ON transition after the ON ONLY switch means is activated, in response to the first OFF-to-ON transition in sequentially retrieved ON/OFF commands following activation of the ON ONLY switch means, not thereafter modifying sequentially retrieved OFF commands to ON commands notwithstanding continued activation of said ON ONLY switch means, and in response to deactivation of the ON ONLY switch means prior to the first OFF-to-ON transition, terminating modification of sequentially retrieved OFF commands to ON commands occurring subsequent to deactivation of the ON ONLY switch means, whereby only OFF commands occurring between initial activation of the ON ONLY switch means and the first to occur of (a) deactivation of the ON ONLY switch means or (b) the first OFF-to-ON transition are modified in response to activation of the ON ONLY switch means.

7. The method of claim 5 wherein said modifying step includes:

activating a manually-activated OFF ONLY switch means to cause, in response to initial activation of the OFF ONLY switch means, sequentially retrieved ON commands to be modified to OFF commands, monitoring the retrieved ON/OFF commands to identify the first ON-to-OFF transition after the OFF ONLY switch means is activated, in response to the first ON-to-OFF transition in sequentially retrieved ON/OFF commands following activation of the OFF ONLY switch means, not thereafter modifying sequentially retrieved ON commands to OFF commands notwithstanding continued activation of said OFF ONLY switch means, and in response to deactivation of the OFF ONLY switch means prior to the first ON-to-OFF transition, terminating modification of sequentially retrieved ON commands to OFF commands occurring subsequent to deactivation of the OFF ONLY switch means, whereby only ON commands occurring between initial activation of the OFF ONLY switch means and the first to occur of (a) deactivation of said OFF ONLY switch means or (b) the first ON-to-OFF transition are modified in response to activation of the OFF ONLY switch means.

8. The method of claim 5 wherein said modifying step includes:

activating a manually-activated ON ONLY switch means to cause, in response to initial activation of the ON ONLY switch means, sequentially retrieved OFF commands to be modified to ON commands, monitoring the retrieved ON/OFF commands to identify the first OFF-to-ON transition after the ON ONLY switch means is activated, in response to the first OFF-to-ON transition in sequentially retrieved ON/OFF commands following activation of the ON ONLY switch means, not thereafter modifying sequentially retrieved OFF commands to ON commands notwithstanding continued activation of said ON ONLY switch means, and in response to deactivation of the ON ONLY switch means prior to the first OFF-to-ON transition, terminating modification of sequentially retrieved OFF commands to ON commands occurring subsequent to deactivation of the ON ONLY switch means, whereby only OFF commands occurring between initial activation of the ON ONLY switch means and the first to occur of (a) deactivation of the ON ONLY switch means or (b) the first OFF-to-ON transition are modified in response to activation of the ON ONLY switch means, activating a manually-activated OFF ONLY switch means to cause, in response to initial activation of the OFF ONLY switch means, sequentially retrieved ON commands to be modified to OFF commands, monitoring the retrieved ON/OFF commands to identify the first ON-to-OFF transition after the OFF ONLY switch means is activated, in response to the first ON-to-OFF transition in sequentially retrieved ON/OFF commands following activation of the OFF ONLY switch means, not thereafter modifying sequentially retrieved ON commands to OFF commands notwithstanding continued activation of said OFF ONLY switch means, and in response to deactivation of the OFF ONLY switch means prior to the first ON-to-OFF transition, terminating modification of sequentially retrieved ON commands to OFF commands occurring subsequent to deactivation of the OFF ONLY switch means, whereby only ON commands occurring between initial activation of the Off ONLY switch means and the first to occur of (a) deactivation of said OFF ONLY switch means or (b) the first ON-to-OFF transition are modified in response to activation of the OFF ONLY switch means.

* * * * *